Patented July 14, 1936

2,047,543

UNITED STATES PATENT OFFICE 2,047,543

METHOD OF DEVELOPING DYES

Don W. Bissell, Hamburg, N. Y., assignor to National Aniline & Chemical Company, New York, N. Y., a corporation of New York No Drawing. Application December 16, 1933, Serial No. 702,797

7 Claims. (Cl. 8—6)

This invention relates to the art of dyes and dyeing and particularly to the conversion of non-coupling diazo or nitrosamine compounds to reactive form. It will be understood that although the term diazo is technically applied only to compounds possessing the —N=N— linkage and the term nitrosamine is used to define the isomers having the

group, the terms as used herein are intended to cover generically the several isomeric forms of such compounds.

In the use of diazo compounds for producing azo prints, the fabric may be first impregnated with or have applied thereto the diazo compound in non-coupling form and the salt of a coupling component, the dye composition being subsequently subjected to suitable development. By one method commonly employed the diazo compound is prepared in the form of a water-soluble metal salt, for instance an alkali-metal salt of a nitrosamine. This is applied to the fabric to be printed, as a paste containing not only the diazo (or more aptly nitrosamine compound) but also a water-soluble salt of a suitable coupling component, such as a phenol, especially a naphthol, so that upon acid development of the print the diazo compound and coupling component unite to form the azo dye. The development of such prints usually is effected by passing the printed fabric through steam and then through an acid developing bath or by exposing the fabric to an atmosphere of steam containing vapors of an acid such as formic or acetic.

In accordance with the present invention I employ carbon dioxide as the acid medium for converting the metal salts of nitrosamines to the active diazo form. Although atmospheric air which has formerly been employed contains traces of carbon dioxide, say .03%, I am not aware that it has before been proposed to employ carbon dioxide in appreciable concentration. I have found that in concentration of .5% or greater the carbon dioxide effects a rapid development of the azo dyes yielding brilliant shades.

The invention is of especial application to those dyes which, when developed by means of an aqueous acid bath, do not always give full strength, presumably because some of the dye washes out. By the use of carbon dioxide the disadvantage of an aqueous bath is avoided.

In the development of an azo dye with steam alone a considerable period of exposure is required to fully develop the dye. In many cases the prolonged exposure of the dye to steam results in decomposition of the dye compound. This is the case, for example, with those nitrosamines containing nitro groups as substituents in the ring. By the use of the concentrations of carbon dioxide contemplated by my invention, the rate of development of the dye is greatly increased so that steam may be used in the development of these relatively sensitive compounds without subjecting them to its action for a sufficiently prolonged period of time to cause injurious reactions.

As above stated, my invention is of general application to the conversion of nitrosamine salts to the coupling-or diazoform. It is however, particularly applicable to the development of prints from those dye preparations containing both a soluble metal salt of a nitrosamine and a soluble metal salt of a coupling component. Any of the prior art aromatic nitrosamine salts and coupling components, such as the aforementioned phenols, are satisfactory but it is desirable, in preparing water-insoluble prints and dyeings, that both the nitrosamine and coupling component be free from water-solubilizing substituents, for example the carboxyl or sulfonate groups, COOMe and $SO_2OMe$, wherein Me represents hydrogen or a solubilizing metal such as an alkali-metal or alkaline-earth-metal. As an example of such preparations may be mentioned the dye preparations on the market under the name of "Rapid Fast Colors". These preparations may contain, in addition to the salts of the nitrosamine and the coupling component, other ingredients such as stabilizing agents, diluents, solubilizing agents, dispersing agents, etc.

My invention is also applicable to the production of multi-color prints where one of the prints is an azo dye and the other a vat dye. Such prints ordinarily are not obtainable using liquid baths for development but where my developing method using steam and carbon dioxide is employed, brilliant shades result.

In carrying out the developing process of this invention, the carbon dioxide may be applied to the fabric either in the presence or absence of steam. It is preferred, however, that the fabric be developed by treating it with steam containing gaseous carbon dioxide. The concentration of the carbon dioxide present in the steam is preferably between 0.5 and 25% by weight.

Carbon dioxide suitable for use in accordance with my invention is readily obtainable; for example it may be obtained commercially either in the solid or liquid form or it may be obtained from waste gases such as flue gases, provided the gases are subjected to suitable purification treatment to remove any injurious constituents they may contain.

The following examples are illustrative of the manner in which my invention may be applied to the development of the azo dyes. Proportions are expressed in parts by weight.

In each of the examples the nitrosamine-naphthol dye preparation employed contains about 13% of the nitrosamine salt, and a naphthol salt, a slight excess over one mol of the latter being present for each mol of the nitrosamine salt; it also contains 2–3% caustic alkali, 30–40% crystallized sodium phosphate ($Na_3PO_4.12H_2O$), and salt (NaCl) constituting the remainder of the preparation.

The starch-tragacanth thickener is prepared by mixing 7 parts of wheat starch, 43 parts of 6% gum tragacanth solution and 50 parts of water, boiling the mixture and subsequently cooling it.

The neutral chromate solution is prepared by mixing 155 parts sodium dichromate

($Na_2Cr_2O_7.2H_2O$), 806 parts water and 43 parts NaOH.

*Example 1.*—A cotton fabric is printed with a paste comprising 6 parts of a dye preparation of the sodium salt of 3-chlor-aniline nitrosamine and the sodium salt of 2,3-hydroxy-naphthanilide, 5 parts of alcohol, 2 parts of a 25% solution of caustic soda, 29 parts of water, and 60 parts of starch-tragacanth thickener. The printed goods are steamed for about 4 minutes with saturated steam (100° C.) containing between about 3% and about 10% of carbon dioxide. The steamed goods are then washed and soaped. The treatment yields a fully developed yellowish-orange print.

By printing goods with the same printing paste and developing the dye by means of a dilute, aqueous acetic acid bath, shades which are only about 50% developed are obtained.

*Example 2.*—A cotton fabric is printed with a dye paste comprising 6 parts of a dye preparation containing the sodium salt of the 4-chlor-2-nitraniline nitrosamine and the sodium salt of 2,3-hydroxynaphthoic-ortho-toluidide, 5 parts ethyl alcohol, 20 parts water, 4 parts of 25% aqueous NaOH solution, 60 parts starch-tragacanth thickener, and 5 parts of neutral chromate solution. The printed goods are steamed for about 2 to 5 minutes with steam containing from 5% to 15% of carbon dioxide. A bluish-red shade is obtained.

In the application of vat dyes the dye is usually applied as a paste containing the vat dye in unreduced form together with sodium formaldehyde sulfoxylate, potassium carbonate, other substances for assisting dispersion or absorption of the reduced compound upon the fibers, and suitable gums or thickeners. After printing of the unreduced vat dye paste on the fiber, it is subjected to aging or steaming to cause the reduction of the vat dye and its absorption by the fibers. The fiber is then subjected to an oxidation treatment for the fixing of the dye on the fiber.

In the production of multi-color prints by the printing of a vat dye and an azo dye side by side on a fabric, the after-treatment of the fabric with an acid bath to develop the azo dye would adversely affect the vat dye printing paste. Hence, the development of the azo dye with an acid dye bath is inapplicable to the preparation of such multi-color prints.

By the method of the present invention the azo dye may be developed by treatment with steam containing carbon dioxide and this treatment serves the purpose, in addition to developing the azo dye, of causing the reduction and absorption of the vat dye. The development or the oxidation of the vat dye may be subsequently effected in the usual manner.

The following example illustrates my method of producing multi-colors by the combination printing of nitrosamine dye paste and vat dye paste.

*Example 3.*—Cotton goods are printed simultaneously with a vat dye paste of Indanthrene green (new Schultz No. 1269) containing 15 parts of Indanthrene green in unreduced form, 10 parts of water and 75 parts of a printing gum consisting of a mixture of 160 parts of potassium carbonate, 480 parts of water, 210 parts of British gum, 50 parts of glycerine, and 100 parts of sodium formaldehyde-sulfoxylate, and a printing paste comprising 6 parts of a dye preparation of the nitrosamine sodium salt of 4-chlor-2-amino-toluene and the sodium salt of 2,3-hydroxy-naphthoic-ortho-toluidide, 5 parts of alcohol, 2 parts of a 25% solution of caustic soda, 27 parts of water, and 60 parts of starch tragacanth thickener, the prints being made side by side on the goods. The printed goods are steamed for about 5 minutes in the absence of air or oxygen the steam employed containing about 5% of carbon dioxide. In this manner the azo dye is developed to give brilliant red shades and the vat dye is reduced to the leuco compound. The goods are then treated with an acid bath containing acetic acid and potassium dichromate in order to develop the vat dye, and are then finished in the usual manner. The Indanthrene green gives green shades. Both the prints from the azo dye and the vat dye are substantially full strength. In the same manner, any other vat dye suitable for printing, whether of the anthraquinone, indigoid or other series, may be used.

If, in Example 3, vapors of formic or acetic acid, or of any acid capable of decomposing carbonates, be used in place of carbon dioxide, the vat dye will not become fully reduced, if at all, to the leuco state and hence will not become fixed on the fiber.

I claim:

1. The method of developing an azo dye on a textile fiber, which comprises contacting the fiber containing a metal salt of an aromatic nitrosamine and a metal salt of a coupling component with steam containing at least .5% of carbon dioxide.

2. The method of producing a printed fabric, which comprises printing the fabric with an aqueous printing paste comprising a water-soluble metal salt of an aromatic nitrosamine and a water-soluble metal salt of a coupling component, both the nitrosamine salt and the salt of the coupling component being free from water-solubilizing substituents, and contacting the printed fabric with carbon dioxide gas in a concentration of at least .5%.

3. The method of producing a printed fabric, which comprises printing the fabric with a printing paste comprising a water-soluble metal salt of an aromatic nitrosamine and a water-soluble metal salt of a coupling component, both the nitrosamine salt and the salt of the coupling component being free from water-solubilizing carboxyl and sulfonate substituents, and bringing the printed fabric into contact with steam containing between about .5% and about 25% of carbon dioxide.

4. The method of producing cotton azo-prints, which comprises printing a cotton fabric with a printing paste comprising the sodium salt of an aromatic nitrosamine and the sodium salt of a naphthol coupling component, said nitrosamine and coupling component salts being free from carboxyl and sulfonate groups, and bringing the printed fabric into contact with steam containing between about 3% and about 25% of carbon dioxide to develop the azo dye on the fabric.

5. The method of producing a printed fabric, which comprises printing the fabric with a vat dye paste containing a vat dye in unreduced form and a reducing agent and with a printing paste comprising the sodium salt of an aromatic nitrosamine and the sodium salt of a coupling component, both the nitrosamine salt and the salt of the coupling component being free from water-solubilizing carboxyl and sulfonate substituents, bringing the printed fabric into contact with steam containing between about .5% and about 25% of carbon dioxide to develop the azo dye on the fabric and effect the reduction of the vat dye to leuco form, and thereafter bringing the printed fabric into contact with an acid oxidizing bath to develop the vat dye.

6. The method of producing combination azo and vat dye cotton prints, which comprises printing a cotton fabric with a vat dye paste containing a vat dye in unreduced form and a reducing agent and with a printing paste comprising the sodium salt of an aromatic nitrosamine and the sodium salt of a naphthol coupling component, said nitrosamine and coupling component salts being free from carboxyl and sulfonate groups, bringing the printed fabric into contact with steam containing between about .5% and about 25% of carbon dioxide to develop the azo dye on the fabric, and thereafter bringing the printed fabric into contact with an acid oxidizing bath to develop the vat dye.

7. The method of developing an azo dye on a textile fiber, which comprises subjecting the fiber containing a mixture of an alkali-metal salt of a coupling component and a salt of the formula

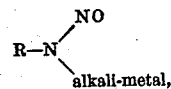

wherein R represents the residue of an aromatic amine, to an atmosphere containing at least .5% carbon dioxide in the presence of $H_2O$.

DON W. BISSELL.